(12) United States Patent
Elliott

(10) Patent No.: US 10,460,058 B2
(45) Date of Patent: Oct. 29, 2019

(54) VERIFICATION OF HARDWARE DESIGNS TO IMPLEMENT FLOATING POINT POWER FUNCTIONS

(71) Applicant: Imagination Technologies Limited, Kings Langley (GB)

(72) Inventor: Sam Elliott, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/249,834

(22) Filed: Jan. 16, 2019

(65) Prior Publication Data

US 2019/0147122 A1 May 16, 2019

Related U.S. Application Data

(63) Continuation of application No. 15/492,205, filed on Apr. 20, 2017, now Pat. No. 10,229,236.

(30) Foreign Application Priority Data

Apr. 27, 2016 (GB) .................................. 1607354.6

(51) Int. Cl.
*G06F 17/50* (2006.01)
*G06F 7/556* (2006.01)
*G06F 7/483* (2006.01)
*G06F 7/552* (2006.01)

(52) U.S. Cl.
CPC ............ *G06F 17/504* (2013.01); *G06F 7/483* (2013.01); *G06F 7/552* (2013.01); *G06F 7/556* (2013.01); *G06F 2217/12* (2013.01)

(58) Field of Classification Search
USPC ......................................................... 716/107
See application file for complete search history.

(56) References Cited

U.S. PATENT DOCUMENTS

| 6,427,160 | B1 | 7/2002 | Parks et al. | |
| 2008/0307030 | A1* | 12/2008 | Ziv | G06F 17/5022 708/505 |
| 2017/0316116 | A1* | 11/2017 | Elliott | G06F 7/483 |
| 2017/0351493 | A1* | 12/2017 | Kintali | G06F 8/20 |
| 2018/0157465 | A1* | 6/2018 | Bittner | G06F 7/483 |

OTHER PUBLICATIONS

Kuliamin; "Test Construction for Mathematical Functions"; Institute for System Programming; Russian Academy of Sciences; Jun. 10, 2008; pp. 23-37.

(Continued)

*Primary Examiner* — Mohammed Alam
(74) *Attorney, Agent, or Firm* — Vorys, Sater, Seymour and Pease LLP; Vincent M DeLuca

(57) ABSTRACT

A method of exhaustively verifying a property of a hardware design to implement a floating point power function. The method includes, formally verifying that the hardware design is recurrent over sets of β input exponents, wherein β is an integer that is a multiple of the reciprocal of the exponent of the power function; and for each recurrent input range of the hardware design, exhaustively simulating the hardware design over a simulation range to verify the property is true over the simulation range, wherein the simulation range comprises only β input exponents.

20 Claims, 5 Drawing Sheets

(56) References Cited

OTHER PUBLICATIONS

Tan et al.; "FPGA Paranoia: Testing Numerical Properties of FPGA Floating Point IP-Cores"; Springer-Verlag Berlin Heidelberg 2012; Mar. 19, 2012; pp. 290-301.
Harrison; "Floating Point Verification in VIOL"; University of Cambridge Computer Laboratory; Sep. 11, 1995; pp. 186-199.
Chen et al; Verification of All Circuits in a Floating-Point Unit Using Word-Level Model Checking; Formal Methods in Computer-Aided Design; Nov. 6, 1996; pp. 19-33.
Kornerup; Computer Correctly Rounded Integer Powers in Floating-Point Arithmetic; ACM Transactions on Mathematical Software, vol. 37, No. 1, Article 4; Jan. 22, 2010; pp. 1-23.
(Note—NPL in parent application).

* cited by examiner

VERIFICATION OF HARDWARE DESIGNS TO IMPLEMENT FLOATING POINT POWER FUNCTIONS

BACKGROUND

A power function is a function of the form $x^t$ where t is a constant real number and x is a variable. Examples of power functions include, but are not limited to $$\frac{1}{x}, \sqrt{x}, \frac{1}{\sqrt{x}} \text{ and } x^{\frac{2}{3}}.$$

A hardware implementation of a power function uses a specific number representation, such as, but not limited to, a fixed point number representation or a floating point representation, to perform the power function. As is known to those skilled in the art a fixed point number representation has a fixed number of digits after the radix point (e.g. decimal point or binary point). In contrast, a floating point number representation does not have a fixed radix point (i.e. it can "float"). In other words the radix point can be placed anywhere within the representation.

The most common floating point standard is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general the three numbers (s, exp, mant) are interpreted, for a fixed integer bias, as shown in equation (1):

$$(-1)^s 2^{exp-bias} 1 \cdot mant \quad (1)$$

IEEE-754 defines the four basic formats shown in Table 1 for floating point numbers with varying degrees of precision. In particular, they are encoded with 16, 32, 64 and 128 bits respectively.

TABLE 1

| Type | Name | Sign Width | Exponent Width (ew) | Mantissa Width (mw) | Bias $2^{ew-1} - 1$ | Roundoff Error (u) |
|---|---|---|---|---|---|---|
| Half | F16 | 1 | 5 | 10 | 15 | $2^{-11}$ |
| Single | F32 | 1 | 8 | 23 | 127 | $2^{-24}$ |
| Double | F64 | 1 | 11 | 52 | 1023 | $2^{-53}$ |
| Quad | F128 | 1 | 15 | 112 | 16383 | $2^{-113}$ |

A property (e.g. error requirement) of a hardware design to implement a power function may be verified via formal verification or simulation-based verification. Formal verification is a systematic process that uses mathematical reasoning to verify a property in a hardware design. In contrast, simulation-based verification is a process in which a hardware design is tested by applying stimuli to the hardware design and monitoring the output of the hardware design in response to the stimuli.

Formal verification can improve controllability as compared to simulation based verification. Low controllability occurs when the number of simulation test signals or vectors required to thoroughly simulate a hardware design becomes unmanageable. For example, a 32-bit comparator requires $2^{64}$ test vectors. This would take millions of years to verify exhaustively by simulation based verification. By performing formal verification, the 32-bit comparator can be verified in less than a minute.

While formal verification can provide advantages over simulation-based verification, hardware designs to implement power functions using a floating point number representation (which are referred to herein as floating point power functions), especially those that have an allowable error (so that many possible output values are valid for the same input), are difficult to verify using formal verification due to their complexity. Accordingly, hardware designs to implement floating point power functions are typically verified through simulation-based verification. However, exhaustive simulation (i.e. testing each possible input) takes a long time, and random simulation (i.e. testing a random subset of possible inputs) is prone to error.

The embodiments described below are provided by way of example only and are not limiting of implementations which solve any or all of the disadvantages of known verification methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for exhaustively verifying a property of a hardware design to implement a floating point power function. The method includes formally verifying that the hardware design is recurrent over sets of β input exponents, wherein β is an integer that is a multiple of the reciprocal of the exponent, t, of the power function; and for each recurrent input range of the hardware design, exhaustively simulating the hardware design over a simulation range to verify the property is true over the simulation range, wherein the simulation range comprises only β input exponents.

A hardware design is said to be recurrent over sets of β input exponents if for any two non-exception floating point inputs in a recurrent input range that have the same input mantissa and have input exponents X and Y that differ by an integer multiple of β, the corresponding floating point outputs produced by the hardware design have the same output mantissa and have output exponents X' and Y' that satisfy the equation X'−t·X=Y'−t·Y.

A first aspect provides a computer-implemented method of exhaustively verifying a property of a hardware design to implement a floating point power function defined by an exponent, the hardware design being configured to, in response to receiving a floating point input that has an input mantissa and an input exponent, produce a corresponding floating point output that has an output mantissa and an output exponent, the method comprising, in one or more processors: formally verifying, using one or more formal assertions, that the hardware design is recurrent over sets of β input exponents, the hardware design being recurrent over sets of β input exponents if for any two non-exception floating point inputs in a recurrent input range that have the same input mantissa and have input exponents X and Y that are related by an integer multiple of β the corresponding floating point outputs produced by the hardware design have the same output mantissa and have output exponents X' and Y' that satisfy the equation X'−t·X=Y'−t·Y, wherein t is the exponent of the floating point power function and β is an integer that is a multiple of 1/t; and for each recurrent input range of the hardware design, exhaustively simulating the hardware design over a simulation range to verify the property over the simulation range, wherein the simulation range comprises floating point inputs based on a set of β input exponents in the recurrent input range.

A second aspect provides a method of generating a hardware implementation of a floating point power function comprising: receiving a hardware design to implement the floating point power function; verifying a property of the hardware design according to the method of the first aspect; and generating a hardware implementation of the floating point power function based on the hardware design.

A third aspect provides a method of generating a hardware implementation of a floating point power function comprising: receiving a hardware design to implement the floating point power function; verifying a property of the hardware design according to the method of the first aspect; in response to the property of the hardware design not being verified, amending the hardware design; and generating a hardware implementation of the floating point power function based on the amended hardware design.

A fourth aspect provides a system for exhaustively verifying a property of a hardware design (to implement a floating point power function defined by an exponent, the hardware design being configured to, in response to receiving a floating point input that has an input mantissa and an input exponent, produce a corresponding floating point output that has an output mantissa and an output exponent, the system comprising: a formal verification tool configured to formally verify that the hardware design is recurrent over sets of β input exponents, the hardware design being recurrent over sets of β input exponents if for any two non-exception floating point inputs in a recurrent input range that have the same input mantissa and have input exponents X and Y that differ by an integer multiple of β the corresponding floating point outputs produced by the hardware design have the same output mantissa and have output exponents X' and Y' that satisfy the equation X'−t·X=Y'−t·Y, wherein t is the exponent of the floating point power function and β is an integer that is a multiple of 1/t; and a simulation engine configured to, for each recurrent input range of the hardware design, exhaustively simulate the hardware design over a simulation range to verify the property over the simulation range, wherein the simulation range comprises floating point inputs based on a set of β input exponents in the recurrent input range.

The preferred features may be combined as appropriate, as would be apparent to a skilled person, and may be combined with any of the aspects of the invention.

BRIEF DESCRIPTION OF THE DRAWINGS

Examples of the invention will be described with reference to the following drawings, in which.

Figure 1:
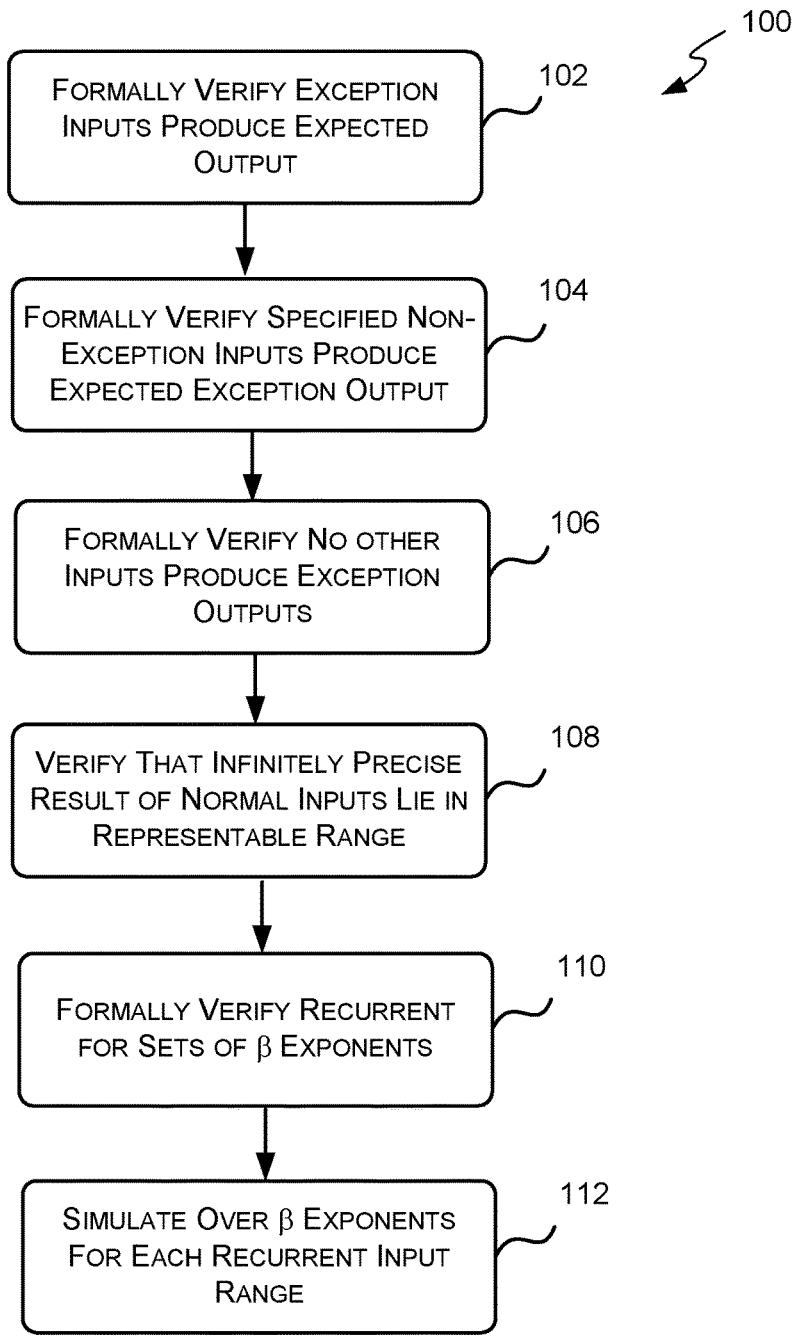
FIG. 1 is a flow diagram of an example method of verifying a property of hardware design to implement a floating point power function.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments described herein relate to methods and systems for exhaustively verifying a property of a hardware design to implement a floating point power function $x^t$ using a combination of formal verification and simulation-based verification. The methods and system described herein take advantage of the fact that hardware to implement floating point power functions are typically designed to process input exponents in a recurrent or repeating manner. Specifically, many hardware designs to implement floating point power functions are designed to process every βth input exponent in the same manner, where β is dependent on the value of the exponent t. A hardware design is said to be recurrent over sets of β input exponents for a particular input range if for any two inputs in the particular input range with the same mantissa but different exponents (X and Y) where X mod β=Y mod β the hardware design produces outputs with the same mantissa but different exponents (X' and Y') that satisfy the equation X'−t·X=Y'−t·Y.

A hardware design to implement a floating point power function may be recurrent over the entire input range (all possible positive and negative input values) or it may be recurrent over positive input values and separately recurrent over the negative input values. For example, if certain rounding methods are used the rounding may be different for positive and negative values. A hardware design to implement a floating point power function that is recurrent over the entire input range is said to have a single recurrent input range whereas a hardware design to implement a floating point power function that is separately recurrent over positive and negative input values is said to have two recurrent input ranges.

The methods described herein for exhaustively verifying a property of a hardware design to implement floating point power function include formally verifying that the hardware design is recurrent for non-exception inputs that produce non-exceptions outputs over sets of β input exponents, where β is a multiple of $$\frac{1}{t}$$

that is an integer, and, for each recurrent input range of the hardware design, simulating the hardware design over a reduced input range that covers only β input exponents. Together the formal verification and the simulation-based verification exhaustively verify the property of the hardware design for non-exception inputs that produce a non-exception output.

The method can be extended to verify the hardware design for exception inputs or outputs by verifying the hardware design acts as expected for exception inputs and exception outputs using formal verification or simulation-based verification.

Since verifying a hardware design to implement a floating point power function is recurrent over sets of β input exponents involves verifying integer properties, rather than more complex floating point properties, such verification can be efficiently done using formal verification.

The methods and systems described herein allow properties of hardware designs of floating point power functions to be exhaustively verified in a fraction of the time compared to pure simulation-based verification methods. For example, the methods described herein reduced the number of input vectors to be simulated to exhaustively verify that a hardware design to implement a reciprocal function ($x^{-1}$) using 32-bit floating point inputs and outputs meets a certain ulp (unit of least precision) error requirement by a factor of 256. This reduced the simulation time from around a day to a few minutes. Similarly the methods described herein have reduced the simulation time to exhaustively verify that a hardware design to implement a reciprocal function using 40-bit floating point inputs and outputs meets a certain ulp error from around two weeks to around an hour.

As described in more detail below, the methods and systems described herein can be used to exhaustively verify (i.e. for all possible input values) that hardware designs of floating point power functions satisfy a given ulp error, or a relative error, requirement. The methods and systems described herein can also be used to exhaustively verify such hardware designs satisfy a variety of other properties, such as but not limited to, a specific rounding mode or monotonicity.

Reference is first made to FIG. 1 which is a flow diagram of an example method 100 for exhaustively verifying a property of a hardware design to implement a floating point power function that uses a combination of formal verification and simulation-based verification. As described above, a power function is a function of the form $x^t$ where t is referred to as the exponent of the power function and x is the input to the power function. The method 100 may be implemented on one or more computing-based devices, such as computing-based device 400 described below with reference to FIG. 4.

The method 100 begins at block 102 where formal verification is performed on the hardware design to verify that the hardware design handles exception inputs as expected.

As is known to those of skill in the art an exception input is an input value which requires special processing. Exceptions typically occur for floating point inputs when the exponent is all zeros or all ones. Example exception types for floating point inputs include: zero, denormal, positive infinity, negative infinity, and NaN (not a number). A zero is typically defined as a floating point number where the exponent and mantissa are both equal to zero. A denormal is typically defined as a floating point number where the exponent is zero, but the mantissa is non-zero. An infinity is typically defined as a floating point number where the exponent is equal to all ones and the mantissa is equal to zero. NaN is a numerical data type value representing an undefined or unrepresentable value and is typically defined as a floating point number where the exponent is equal to all ones and the mantissa is non-zero. In some implementations special NaNs have a predefined mantissa value.

For all types of exceptions the sign bit indicates whether the exception is positive or negative. It will be evident to a person of skill in the art that these are example exceptions only and a hardware design to implement a floating point power function may deal with all of the example exceptions, none of the example exceptions or other exceptions in combination with or instead of the example exceptions.

Hardware designs are typically designed to output a specific value (e.g. an exception) in response to an exception input. Exception inputs and their expected output are typically defined in the specification for the hardware design and can be easily extracted therefrom. Formal verification of a hardware design to ensure that the hardware design handles exception inputs as expected may comprise formally verifying one or more assertions to verify that when the hardware design receives an input of a certain exception type it produces the expected output.

As is known to those of skill in the art an assertion is a statement about a specific property that is expected to hold for a hardware design (i.e. is always true). In other words, an assertion is an expression that, if evaluated to be false on the hardware design, indicates an error. An assertion may also be referred to as a "lemma" in some programming languages and tools, such as Synopsys' HECTOR.

Within a HDL hardware design, an assertion is an executable statement that checks for specific behavior within the HDL hardware design. For example if a hardware design contains a FIFO (first in first out) buffer the designer would define assertions that capture the design intent (e.g. that neither overflow nor underflow of the FIFO may occur).

An assertion is typically written in an assertion language. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

An assertion for a specific type of exception input (e.g. zero, positive infinity, negative infinity, denormal, NaN) may state or assert that when the input is of the specific exception type (e.g. zero, positive infinity, negative infinity, denormal, NaN) then the output has a specific format (e.g. is a specific exception type). For example, an assertion may state that when a zero input is received a zero is output. Example assertions for verifying that a hardware design produces expected outputs in response to exception inputs will be described below. Once the processing of exception inputs by the hardware design has been formally verified the method 100 proceeds to block 104.

At block 104, formal verification is performed on the hardware design to verify that the hardware design generates an output exception in response to certain non-exception inputs as set out in the specification for the hardware design.

As described above, an exception output is typically produced in response to an exception input. However, an exception output may also be produced in response to certain non-exception inputs because these inputs cannot be properly processed by the hardware design. For example, very small input values and very large input values may cause underflow (the result of the floating point operation is larger than the largest positive value or smaller than the smallest negative value) or overflow (the result of the floating point operation is smaller than the smallest positive value, or larger than the largest negative value).

Formal verification of a hardware design to ensure that the hardware design produces exception outputs for certain non-exception inputs as expected may comprise formally verifying one or more assertions that state if the hardware design receives certain non-exception inputs it generates a particular exception output. Example assertions for verifying that a hardware design produces exception outputs in response to certain non-exception inputs as expected will be described below.

Once the hardware design has been formally verified to ensure that the hardware design produces exception outputs for certain non-exception inputs according to the specification, the method 100 proceeds to block 106.

At block 106, formal verification is performed on the hardware design to verify that no input values, other than those identified in the specification, produce an exception output. The formal verification may be performed by formally verifying an assertion that states that when the hardware design receives any input, other than those identified in blocks 102 (exception inputs) and 104 (non-exception inputs that produce exception outputs), that the resulting output will not be an exception. An example assertion for formally verifying that no input values, other than those identified in the specification produce an exception output will be described below. Once formal verification of the hardware design to verify no other inputs produce exception outputs has been completed, the method 100 proceeds to block 108.

At block 108, a paper and pen proof is completed to verify that the infinitely precise result to the power function for all remaining inputs (non-exception inputs that do not produce an exception output) lies between the smallest and largest representable normal values of the floating point output. The method 100 then proceeds to block 110.

At block 110, formal verification is performed on the hardware design of the floating point power function $x^t$ to verify that the hardware design is recurrent over sets of $\beta$ input exponents, where $\beta$ is an integer that is a multiple of $$\frac{1}{t}.$$

In other words $\beta$ is an integer that is a multiple of the reciprocal of the exponent of the power function.

As described above, a hardware design to implement a floating point power function is said to be recurrent over sets of $\beta$ input exponents if for any two floating point inputs (x and y), in the same recurrent input range, with the same input mantissa where the difference between their input exponents (X and Y) is a multiple of $\beta$ (i.e. X mod $\beta$=Y mod $\beta$) the corresponding floating point outputs have the same output mantissa and have output exponents (X' and Y') that satisfy the equation X'−t·X=Y'−t·Y.

In particular, if two floating point inputs x and y have the same mantissa they will be related as shown in equation (2):

$$x = y \cdot \frac{2^{exp\_y}}{2^{exp\_x}} = y \cdot 2^{exp\_y - exp\_x} \quad (2)$$

As such $x^t$ and $y^t$ are related as shown in equation (3):

$$x^t = y^t \times \frac{2^{t \cdot exp\_x}}{2^{t \cdot exp\_y}} = y^t \times 2^{t \cdot (exp\_x - exp\_y)} \quad (3)$$

If the difference between the exponents for x and y (exp_x−exp_y) is a multiple of $\beta$ (which is an integer that is a multiple of $$\frac{1}{t})$$

then the difference between $x^t$ and $y^t$ will be a power of 2 which will be represented in the output exponents, not the mantissas.

Accordingly, when a hardware design to implement a floating point power function is recurrent over sets of $\beta$ exponents, the hardware design calculates the mantissa in the same way between sets of $\beta$ exponents. In other words the error in the mantissa will be the same.

Figure 2:
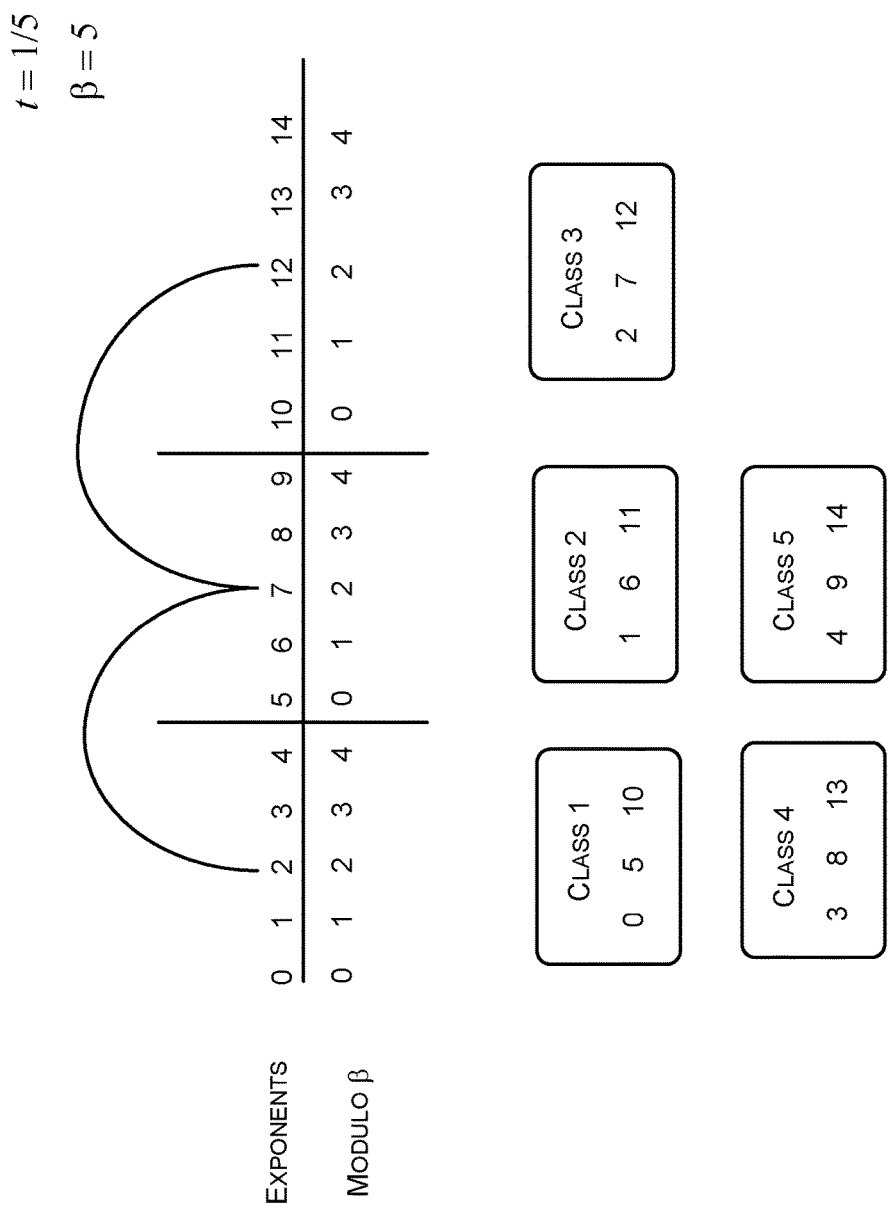
FIG. 2 is a schematic diagram illustrating recurrency over sets of β input exponents.

Reference is now made to FIG. 2 which illustrates the relationship between a set of input exponents from 0 to 14 that are recurrent over sets of $\beta$ input exponents. Where the exponent, t, of the power function is equal to ⅕ and $\beta$ is equal to five then two inputs with exponents that differ by a multiple of $\beta$ (i.e. they have the same value modulo $\beta$) will produce the same mantissa output for the same input mantissa. For example, inputs with an exponent of 2, 7 (2+$\beta$) or 12 (2+2$\beta$) and the same mantissa will produce the same output mantissa.

Input exponents which, for the same input mantissa, will produce the same output mantissa (i.e. those exponents which differ from each other by an integer multiple of $\beta$) are said to be congruent and form part of the same exponent class. Since there are $\beta$ possible values modulo $\beta$ there will be $\beta$ exponent classes. For example, in the example of FIG. 2, $\beta$ is equal to five thus there are five exponent classes, the first class comprises those exponents that have a value modulo $\beta$ of zero; the second class comprises those exponents that have a value modulo $\beta$ of one; the third class comprises those exponents that have a value modulo $\beta$ of two; the fourth class comprises those exponents that have a value modulo $\beta$ of three; and the fifth class comprises those exponents that have a value modulo $\beta$ of four.

Formally verifying that a hardware design is recurrent over sets of $\beta$ input exponents may comprise verifying one or more assertions that state when the mantissa of any two floating point inputs of the same recurrent input range are the same and the difference between their exponents X and Y is an integer multiple of $\beta$ the output mantissa will be the same and the output exponents X' and Y' will satisfy equation X'−t·X=Y'−t·Y. Example assertions for verifying that a hardware design is recurrent over sets of $\beta$ input exponents will be described below.

As described above, some hardware designs are recurrent over the entire input range whereas other hardware designs are separately recurrent over the positive input range and the negative input range. Where the hardware design has two separate recurrent input ranges then formal verifying the hardware design is recurrent over sets of $\beta$ input exponents may comprise formally verifying the hardware design is recurrent over sets of $\beta$ input exponents within each recurrent input range separately.

Referring back to FIG. 1, once the hardware design has been formally verified to be recurrent over sets of $\beta$ input exponents, the method 100 proceeds to block 112.

At block 112, the hardware design of the floating point power function is exhaustively simulated over only $\beta$ input exponents for each recurrent input range to prove that the hardware design satisfies the property (e.g. relative error bound or ulp error bound). Accordingly where the hardware design has only one recurrent input range (e.g. the hardware design is continuously recurrent over the entire input range) then the hardware design is exhaustively simulated over only β input exponents; and where the hardware design has two recurrent input ranges (e.g. the hardware design is separately recurrent over positive and negative inputs) then the hardware design is exhaustively simulated over 2β input exponents.

The β input exponents for each recurrent input range may be a sequential set of β input exponents, such as but not limited to the range [bias, bias+β). However, any subset of β input exponents that includes an exponent for each possible value modulo β could be used. In other words any subset of β input exponents that includes at least one input exponent from each exponent class could be used.

For example, in the example shown in FIG. 2, the hardware design may be exhaustively simulated over a sequential set of β exponents such as [0, 1, 2, 3, 4] or [5, 6, 7, 8, 9], or a non-sequential set of β exponents such as [0, 6, 7, 8, 14].

The inventors have identified that if a hardware design to implement a floating point power function with an allowable error satisfies the appropriate error bound for all possible inputs for a set of β exponents that include one exponent from each exponent class; and the hardware design is recurrent for each β input exponents then the hardware design satisfies the appropriate error bound for all inputs. A mathematical proof of this identification is provided below. Accordingly, method 100 can be used to exhaustively prove that the hardware design satisfies the appropriate error bound by formally verifying the hardware design is recurrent over β input exponents; and only simulating the hardware design over β input exponents for each recurrent input range.

The method 100 described herein can also be used to verify that a hardware design to implement a floating point power function correctly implements a particular rounding mode. In particular, by verifying through simulation that the hardware design correctly rounds the output for a set of β input exponents for each recurrent input range; and formally verifying that the hardware design is recurrent over sets of β input exponents; it can be assured that the hardware design correctly implements the rounding mode for all inputs.

The method 100 described here can also be used to verify monotonicity in a hardware design to implement a floating point power function. As is known to those of skill in the art a function is said to be monotonic if and only if it is entirely increasing or decreasing. A hardware design can be verified to be monotonic by verifying through simulation that the hardware design is monotonic for a set of β input exponents; formally verifying that the hardware design is recurrent over β input exponents; and verifying that a single input value immediately above or below the reduced simulation range satisfies the monotonicity. Checking this additional value ensures that the output sections do not overlap. It will be evident to a person of skill in the art that where the β input exponents do not form a sequential set of input exponents, additional verification may be performed to verify that the input exponents connect as expected.

The method 100 described herein can also be used to verify that two hardware designs for a floating point power function always produce the same result or output. In particular if the two hardware designs are formally verified to be recurrent over sets of β input exponents and then the two hardware designs are exhaustively simulated against each other over a set of β input exponents for each recurrent input range to prove they produce the same output, then it can be guaranteed that the two hardware designs produce the same output for all possible inputs. It is noted that such a verification does not guarantee the accuracy of either hardware design only that they produce the same result.

Similarly, the method 100 described herein can also be used to verify that one hardware design for a floating point power function always produces or outputs a value that is less than (or greater than) the value produced or output by another hardware design for a floating point power function for the same input; or that two different hardware designs for floating point power functions produce outputs that differ at most by a certain ulp or relative value. It is noted that such a verification does not guarantee the accuracy of either hardware design only that the specified property is satisfied.

In other example methods, instead of formally verifying the hardware design correctly handles exception inputs and outputs as described with reference to blocks 102 and 104, the handling of exception inputs and exception outputs by the hardware design may be verified through simulation-based verification. In these alternative examples, the method may not include blocks 102 and 104 and the test vectors used in block 112 may additionally include test vectors to test the exception inputs and exception outputs.

Figure 3:
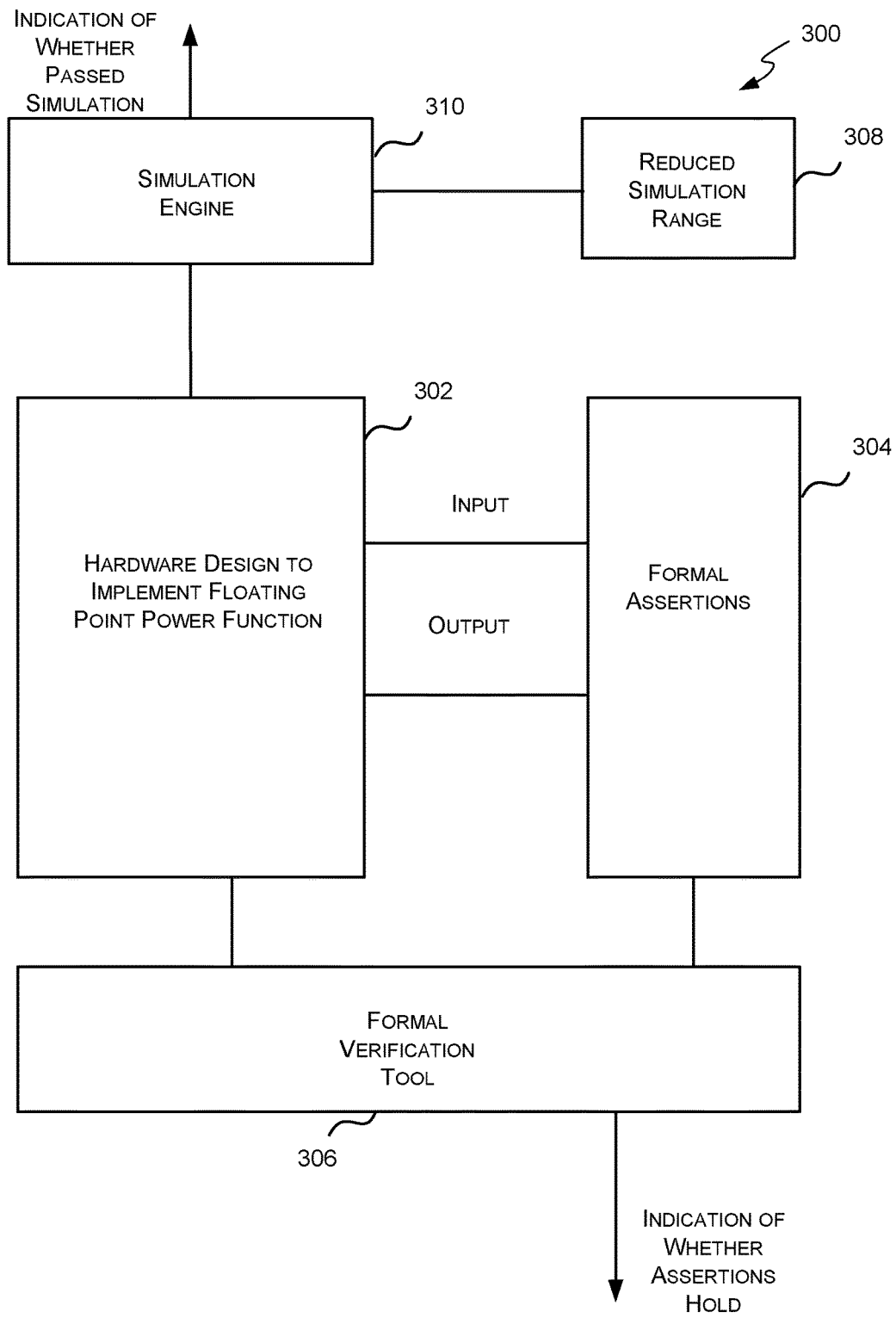
FIG. 3 is a block diagram of a system for verifying a property of a hardware design to implement a floating point power function using the method of FIG. 1.

Reference is now made to FIG. 3 which shows a block diagram of an example system 300 for verifying a property of a hardware design to implement a floating point power function using the method 100 of FIG. 1. The system 300 comprises a hardware design 302 to implement a floating point power function; one or more assertions 304; a formal verification tool 306; a definition of the simulation range 308; and a simulation engine 310.

The term "hardware design" is used herein to refer to a description of an integrated circuit which can be used to generate a hardware manifestation of the integrated circuit (e.g. the hardware design may be synthesised into silicon or used to program a field-programmable gate array (FPGA)). The hardware design may be implemented in a high level hardware description language (HDL), such as, but not limited to, a register transfer level (RTL) language. Examples of register transfer level languages include, but are not limited to, VHDL (VHSIC Hardware Description Language) and Verilog. It will be evident to a person of skill in the art that other high level languages may be used such as proprietary high level languages.

The hardware design 302 of FIG. 3 describes an integrated circuit for implementing a floating point power function. As described above, a floating point power function is a power function that is implemented using a floating point number representation. Accordingly a floating point power function receives a floating point input and produces a floating point output. The input and output may have the same floating point format (e.g. precision) or they may have different floating point formats (e.g. precision).

The formal assertions 304 set out the properties of the hardware design 302 that are to be formally verified. The formal assertions 304 include one or more assertions for verifying that the hardware design is recurrent over sets of β input exponents. The formal assertions 304 may also include one or more assertions for verifying that the hardware design produces the expected output for exception inputs; one or more assertions for verifying that the hardware design produces an exception output for certain non-exception inputs; and one or more assertions for verifying that the hardware design does not produce any unexpected exception outputs.

As described above, an assertion is a statement that a particular property is expected to hold for a hardware design (i.e. is always true). An assertion of the form "assert property [evaluable expression]" is said to "assert" the property specified by the "evaluable expression". If an asserted property (e.g. the evaluable expression) is evaluated to be false for the hardware design for any input the hardware design is not behaving as expected and there is an error. For example, in the example assertion "assert property a=b"; if a is not equal to b then the hardware design is not behaving as expected and there is an error.

Assertions are used to capture required temporal and combinational behavior of the hardware design in a formal and unambiguous way. The hardware design can then be verified to determine that it conforms to the requirement as captured by the assertion(s). Since assertions capture the hardware design behavior on a cycle-by-cycle basis they can be used to verify intermediate behaviors.

As described above, assertions are typically expressed in an assertion language. An assertion language, which may also be referred to as a property language, captures the hardware design behavior spread across multiple hardware design cycles (e.g. clock cycles) in a concise, unambiguous manner. While traditional high level description languages (HDL), such as an RTL language, have the ability to capture individual cycle behavior, they are too detailed to describe properties at a higher level. In particular, assertion languages provide means to express temporal relationships and complex hardware design behaviors in a concise manner. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

The formal assertions 304 are bound to the input and output of the hardware design 302. For example, where the formal assertions 304 are implemented in SVA and the hardware design 302 is in the form of RTL code, the SVA code is bound to the RTL code.

The hardware design 302 (e.g. RTL), formal assertions 304 (e.g. SVA) and bindings are loaded into a formal verification tool 306. The formal verification tool 306 is a software tool that is capable of performing formal verification of a hardware design. Examples of formal verification tools include, but are not limited to, Mentor Graphics Questa®️ Formal Verification, Synopsys VC Formal, Cadence®️ Incisive®️ Enterprise Verifier, JasperGold®️, and OneSpin 360 DV™.

Formal verification is a systematic process that uses mathematical reasoning to verify a property in a hardware design. Formal verification can be contrasted to simulation-based verification in which a hardware design is verified by applying stimuli to the hardware design and monitoring the output of the hardware design in response to the stimuli.

In formal verification, the hardware design 302 is transformed into a mathematical model (e.g. a state-transition system) and the assertions are expressed using mathematical logic using a precise syntax or a language with a precise mathematical syntax and semantics.

An assertion is verified by searching the entire reachable state space of the hardware design 302 without explicitly traversing the state machine. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability.

Since formal verification algorithmically and exhaustively explores all input values over time, verifying properties in this manner allows a property to be exhaustively proved or disproved for all states.

The formal verification tool 306 may output an indication of whether the assertions are true for the hardware design 302 (i.e. the hardware design 302 behaves as expected). The output may be yes the assertions are true for the hardware design 302; at least one of the assertions is not true for the hardware design 302; or the formal verification was inconclusive. The formal verification may be inconclusive, for example, because the computing-based device running the formal verification tool 306 has run out of memory or because the formal verification tool 306 has determined that a certain amount of progress has not been made after a predefined period of time. In some cases, where at least one assertion failed, the formal verification tool 306 may also output information indicating when and/or where the assertion failed to aide designers in correcting or amending the hardware design 302.

Accordingly, the formal verification tool 306 evaluates each assertion 304 to determine if there is a state of the hardware design 302 in which the assertion is not true.

The reduced simulation range 308 defines the input range over which the hardware design 302 is to be simulated. As described above, the reduced simulation range covers, for each recurrent input range, all possible inputs for a set of $\beta$ input exponents that covers one exponent from each exponent class (e.g. the set [bias, bias+$\beta$)).

The simulation engine 310 is a software tool capable of performing simulation-based verification of a hardware design over the reduced simulation range 308. In particular, the simulation engine 310 monitors the output of the hardware design in response to each input in the reduced simulation range 308 (i.e. each valid input based on the set of $\beta$ input exponents—in other words each valid mantissa and exponent combination based on the exponents in the set of $\beta$ input exponents) to determine if a specific property (e.g. ulp error or relative error) is met.

The simulation engine 310 may perform the simulation-based verification using any known method. For example, the simulation engine 310 may receive the hardware design in, for example HDL, convert the HDL to another language, such as C, and perform the simulation on the C code; the simulation engine 310 may receive the hardware design as, for example, HDL and perform the simulation directly on the HDL; or the simulation engine 310 may implement the hardware design in hardware and perform the simulation on the hardware.

Once the simulation is complete the simulation engine 310 may output an indication of whether or not the hardware design passed the simulation (i.e. the outputs for all inputs in the reduced simulation range satisfied the property).

Once the verification (formal and simulation-based) is complete the hardware design 302 may be modified based on the outcome of the verification (e.g. the information output by the formal verification tool 306 and/or the simulation engine 310). For example, if the verification identifies the hardware design 302 is not operating as expected then the hardware design 302 may be modified to correct its operation. The modified hardware design may then be re-verified, and once verified to be operating as expected the modified hardware design may be implemented in hardware to generate an integrated circuit as described with reference to FIG. 5.

Exemplary details for implementing the method 100 of FIG. 1 will now be described.

Formal Verification of Exception Inputs

As described above in reference to block 102 of FIG. 1, one aspect of verifying a hardware design to implement a floating point power function $x^t$ comprises verifying that the hardware design handles exception inputs as expected (e.g. exception inputs produce certain exception outputs as specified in the specification for the hardware design). For example the specification for a hardware design to implement a floating point power function where t is an odd integer may specify, as shown in Table 2, that when the following exceptions inputs are received that the exception outputs are produced.

TABLE 2

|  | Input | Output |
| --- | --- | --- |
| Positive t | NaN | NaN (special) |
|  | ±∞ | ±∞ |
|  | ±0 | ±0 |
|  | ±denormal | ±0 |
| Negative t | NaN | NaN (special) |
|  | ±∞ | ±0 |
|  | ±0 | ±∞ |
|  | ±denormal | ±∞ |

In another example, the specification for a hardware design to implement a floating point power function where the exponent (t) is an even integer may specify, as shown in Table 3, that when the following exception inputs are received that the following exception outputs are produced.

TABLE 3

|  | Input | Output |
| --- | --- | --- |
| Positive t | NaN | NaN (special) |
|  | ±∞ | +∞ |
|  | ±0 | +0 |
|  | ±denormal | +0 |
| Negative t | NaN | NaN (special) |
|  | ±∞ | +0 |
|  | ±0 | +∞ |
|  | ±denormal | +∞ |

In yet another example, the specification for a hardware design to implement a floating point power function where the exponent (t) is a fractional value may specify, as shown in Table 4, that when the following input exceptions are received that the following output exceptions are output.

TABLE 4

|  | Input | Output |
| --- | --- | --- |
| Positive t | NaN | NaN (special) |
|  | +∞ | +∞ |
|  | −∞ | NaN (special) |
|  | ±0 | ±0 |
|  | ±denormal | ±0 |
| Negative t | NaN | NaN (special) |
|  | +∞ | +0 |
|  | −∞ | NaN (special) |
|  | ±0 | +∞ |
|  | ±denormal | +∞ |

The hardware design may be formally verified to ensure that it handles exception inputs as expected using one assertion for each exception input type. Each assertion states that when the input has a certain format then the output has a certain format.

The following is a set of three example SVA assertions, based on Table 2 (odd, negative t), to verify a hardware design to implement a reciprocal function ($x^{-1}$; t=−1) with single floating point precision (e.g. F32) inputs and outputs. In the example assertions, A1 represents the input to the hardware design; Y1 represents the output of the hardware design; and A1[i] and Y1[i] denote the $i^{th}$ bit of the input and output respectively.

```
nan_assertion:  assert property (
    ((A1[30:23] == 8'hFF) && (A1[22:0] != 0) )
        |-> (Y1 == 32'h7FC00000));
inf_assertion:  assert property (
    ((A1[30:23] == 8'hFF) && (A1[22:0] == 0) )
        |-> ((Y1[31] == A1[31]) &&
             (Y1[30:0] == 0 )));
zero_denorm_assertion:  assert property (
    (A1[30:23] == 8'h00)
        |-> ((Y1[31] == A1[31]) &&
             (Y1[30:0] == 31'h7F800000)));
```

The first assertion ("nan_assertion") states that when the input is a NaN (i.e. when the exponent (A1 [30:23]) is all ones (8' hFF=8 bits have a hexadecimal value of FF) and the mantissa (A1 [22:0]) is not equal to zero) then in the same cycle (|->) the output (Y1) is equal to NaN (special) (i.e. has a hexadecimal value of 7FC00000). The second assertion ("inf_assertion") states that when the input is positive or negative infinity (i.e. when the exponent (A1 [30:21]) is all one's (8' hFF) and the mantissa (A1 [22:0]) is equal to zero) then in the same cycle (|->) the output (Y1) is equal to zero. The third assertion ("zero-denorm assertion") states that when the input is a denormal or zero (i.e. when the exponent (A1 [30:21]) is all zeros (8' h00)) then in the same cycle (|->) the output (Y1) is equal to positive/negative infinity (i.e. the sign of the output (Y1 [31]) is the same as the sign of the input (A1 [31]) and the remaining bits of the output (Y1 [30:0]) has a hexadecimal value of 7F800000).

It will be evident to a person of skill in the art that these are examples assertions only and other suitable assertions may be developed in other assertion-based languages and/or may establish different relationships between exception inputs and exception outputs based on the specification for the hardware design being verified. For example, other assertions may specify a different time relationship between inputs and outputs to account for any delay between when an input is received to when the corresponding output value is produced.

Formal Verification of Non-Exception Inputs that Produce Exception Outputs

As described above in reference to block 104 of FIG. 1, another aspect of verifying a hardware design to implement a floating point power function $x^t$ comprises verifying that the hardware design produces exception outputs for certain non-exception inputs. For example, very small input values and very large input values may cause underflow (the result of the floating point operation is larger than the largest positive value or smaller than the smallest negative value) or overflow (the result of the floating point operation is smaller than the smallest positive value, or larger than the largest negative value).

The following is an example assertion to verify that a hardware design that implements a reciprocal function ($x^{-1}$; t=−1) with single floating point precision (e.g. F32) inputs and outputs, generates a zero in response to receiving a "very large" input. In the example assertion, A1 represents the input to the hardware design; Y1 represents the output of the hardware design; and A1 [i] and Y1 [i] denote the $i^{th}$ bit of the input and output respectively.

```
large_input_assertion: assert property (
    (((A1[30:23] == 8'hFD) && (A1[22:0] != 0)) ||
(A1[30:23] == 8'hFE))
    |-> ((Y1[31] == A1[31] ) && (Y1[30:0] == 0 )));
```

This assertion ("large input assertion") states that when the input is a large input (i.e. when the exponent (A1 [30:23]) has a hexadecimal value of FD (8'hFD=8 bits have a hexadecimal value of FD) and the mantissa (A1 [22:0]) is not equal to zero OR when the exponent (A1 [30:23]) has a hexadecimal value of FE (8'hFE)) then in the same cycle (|->) the output (Y1) is equal to zero.

It will be evident to a person of skill in the art that this is an example assertion only and other suitable assertions may be developed in other assertion-based languages and/or may establish different relationships between non-exception inputs and exception outputs based on the specification for the hardware design. For example, other assertions may specify a different time relationship between inputs and outputs to account for any delay between when an input is received to when the corresponding output value is produced.

Formal Verification that No Unexpected Exception Outputs

As described above in reference to block 106 of FIG. 1, another aspect of verifying a hardware design to implement a floating point power function $x^t$ comprises verifying that the hardware design does not produce any unexpected exception outputs. In other words, it is important to verify that the hardware design will not produce an exception output in response to any other inputs than those identified in blocks 102 and 104 (i.e. in response to exception inputs; and in response to special non-exception inputs identified as producing exception outputs).

As described above, the hardware design may be formally verified to ensure that it does not produce any unexpected exception outputs using one or more assertions. For example, a suitable assertion may state that for all inputs other than those identified in blocks 102 and 104 the output is not an exception (e.g. the output exponent is not equal to zero or all ones).

The following is an example SVA assertion to verify that a hardware design to implement a reciprocal function ($x^{-1}$; t=-1) with single floating point precision (e.g. F32) inputs and outputs does not generate an unexpected exception output. In the example assertion, A1 represents the input to the hardware design; Y1 represents the output of the hardware design; and A1 [i] and Y1 [i] denote the $i^{th}$ bit of the input and output respectively.

```
no_exception_output_assertion: assert property
(( A1[30:23] != 8'hFF )           //no infs or NaN
&& (A1[30:23] != 8'hFE)           //no large input
&& ( (A1[30:23] != 8'hFD) || ( A1[22:0] == 0 )
&& ( ext.A[30:23] != 8'h00))      //no zeroes or
                                  //denorms
    |-> ((Y1[30:23] != 0)
        && (Y1[30:23] != 8'hFF)));
```

This assertion ("no_exception_output_assertion") states that when the input is not an infinity or NaN (i.e. the exponent (A1 [30:23]) is equal to all ones); not a large input (the exponent (A1 [30:23]) has a hexadecimal value of FD (8'hFD=8 bits have a hexadecimal value of FE) and the mantissa (A1 [22:0]) is not equal to zero OR when the exponent (A1 [30:23]) has a hexadecimal value of FE (8'hFE)); and not a zero or denormal (i.e. the exponent (A1 [30:23]) is equal to zero (8'h00)) then in the same cycle (|->) the output (Y1) is not an exception (i.e. the exponent Y1 [30:23] is not equal to zero or all ones (8'hFF)).

It will be evident to a person of skill in the art that this is an example assertion only and other suitable assertions may be developed in other assertion-based languages and/or may establish a different definition of non-exception inputs and exception outputs based on the specification of the hardware design being verified. For example, other assertions may specify a different time relationship between inputs and outputs to account for any delay between when an input is received to when the corresponding output value is produced.

Formal Verification that Hardware Design is Recurrent

As described above in reference to block 110 of FIG. 1, formally verifying that a hardware design to implement a floating point power function is recurrent over sets of β input exponents, where β is an integer that is a multiple of the reciprocal of t, significantly reduces the number of test vectors to be simulated to exhaustively verify the operation of the hardware design. In particular, by formally verifying that the hardware design is recurrent over sets of β input exponents only β exponents are simulated for each recurrent input range to exhaustively verify the operation of the hardware design.

Clearly the smaller β the more significant the reduction in the number of test vectors to be simulated. To achieve the highest reduction in the number of test vectors to be simulated, β is the smallest multiple of $$\frac{1}{t}$$

that produces an integer. Accordingly, where t is an integer β is optimally one, and where t is a fraction β is optimally the denominator of the fraction.

As described above, a hardware design is said to be recurrent over sets of β exponents if for any two inputs in the same recurrent input range that have the same input mantissa and that have input exponents X and Y that are equal modulo β (i.e. X mod β=Y mod β) the hardware design produces corresponding outputs that have the same output mantissa and have output exponents X' and Y' that satisfy the equation X'-t·X=Y'-t·Y.

As described above, a hardware design may be continuously recurrent over the entire input space (all possible positive and negative input values) or it may be recurrent over positive input values and separately recurrent over the negative input values. For example, if certain rounding methods are used the rounding may be different for positive and negative values.

Where a hardware design to implement a floating point power function is continuously recurrent over the entire input space (positive and negative inputs) formally verifying that the hardware design is recurrent over sets of β input exponents may comprise two phases: (1) formally verifying that the hardware design maintains a predetermined relationship between positive and negative inputs; and (2) formally verifying that the hardware design is recurrent every β exponents for either negative or positive signed inputs.

Where a hardware design is continuously recurrent over the entire input space there will be a specified relationship between positive and negative inputs. For example, for even integer values of t the power function F will likely be even so that F(−x)=F(x); and for odd integer values of t the power function F will likely be odd so that F(−x)=−F(x). It will be evident to a person of skill in the art that these are example relationships between positive and negative inputs and the specification for the particular hardware design being verified may indicate a different relationship between negative and positive inputs.

The hardware design may be formally verified to ensure that it maintains the predetermined relationship using one or more assertions that compare the inputs and outputs of two copies of the hardware design. For example, for even power functions an assertion may state that if the inputs to the two copies have the same input mantissa and input exponent, but different signs the outputs will be the same; and for odd power functions the assertion may state that if the inputs to the two copies have the same input mantissa and input exponent, but different signs the outputs will have the same output mantissa and output exponent, but different signs.

The following is an example SVA assertion to verify that a hardware design to implement a reciprocal function ($x^{-1}$; t=−1) with single floating point precision (e.g. F32) inputs and outputs is odd (i.e. that two inputs with the same input mantissa and input exponent, but different signs, produce outputs with the same output mantissa and output exponent, but different signs). In the example assertion, A1 represents the input to the first copy of the hardware design; A2 represents the input to the second copy of the hardware design; Y1 represents the output of the first copy of the hardware design; Y2 represents the output of the second copy of the hardware design; and A1 [i], A2 [i], Y1 [i] and Y2 [i] denote the $i^{th}$ bit of the inputs and outputs respectively.

```
odd_function_assertion: assert property (
    ((A1[30:0] == A2[30:0]) & (A1[31] != A2[31]))
    && (( A1[30:23] != 8'hFF )    //no infs or NaNs
    && (A1[30:23] != 8'hFE)       //no large inputs
    && ((A1[30:23] != 8'hFD) || (A1[22:0] == 0))
    && (A1[30:23] != 8'h00 )) //no zeroes or
                              //denorms
    |-> (( Y1[30:0] == Y2[30:0] )
    && ( Y1[31] != Y2[31] ) ) );
```

This assertion ("odd_function_assertion") states that when the inputs to the two copies of the hardware design have the same input mantissa and input exponent (A1 [30:0]==A2 [30:0]), but have different signs (A1 [31] !=A2 [31]) then in the same cycle (|->) the outputs of the two copies of the hardware design will have the same output mantissa and output exponent (Y1 [30:0]==Y2 [30:0]), but have different signs (Y1 [31] !=Y2 [31]). The assertion also excludes all of the inputs that produce an exception output (i.e. infinity or NaN (i.e. the exponent (A1 [30:23] is equal to all ones); large input (the exponent (A1 [30:23]) has a hexadecimal value of FD (8'hFD) and the mantissa (A1 [22:0]) is not equal to zero OR when the exponent (A1 [30:23]) has a hexadecimal value of FE (8'hFE)); and a zero or denormal (i.e. the exponent (A1 [30:23] is equal to zero (8'h00)).

The second phase of the formal verification is formally verifying that the hardware design is recurrent for every β input exponents for either negative or positive signed inputs. The recurrent property is only formally verified for positive inputs or negative inputs since the predetermined relationship between even and odd inputs has been verified as described above.

If the hardware design is such that whenever the mantissa of two inputs is equal (mant_in_x=mant_in_y) and the exponents of the two inputs are the same modulo β—the mantissa of the two outputs are equal (mant_out_x=mant_out_y) and the exponents are related as shown in equation (4)—then the hardware design is recurrent every β input exponents. When t is a fraction of the form $$\frac{n}{m}$$

equation (4) can be re-written as equation (5) so that it is phrased using integer operations which can be calculated without rounding.

$$\exp\_out\_x - t \cdot \exp\_in\_x = \exp\_out\_y - t \cdot \exp\_in\_y \quad (4)$$

$$m \cdot \exp\_out\_x - n \cdot \exp\_in\_x = m \cdot \exp\_out\_y - n \cdot \exp\_in\_y \quad (5)$$

Accordingly formally verifying that the hardware design is recurrent for each set of β exponents for either negative or positive signed inputs may comprise formally verifying an assertion that compares the inputs and outputs of two copies of the hardware design. For example, the assertion may state that if the inputs to the two copies have the same input mantissa then the outputs will have the same output mantissa and the output exponents will be related as set out in equation (4) or equation (5).

The following is an example SVA assertion to verify that a hardware design of a reciprocal function ($x^{-1}$; t=−1) with single floating point precision (e.g. F32) inputs and outputs is recurrent every β input exponents. In the example assertion, A1 represents the input to the first copy of the hardware design; A2 represents the input to the second copy of the hardware design; Y1 represents the output of the first copy of the hardware design; Y2 represents the output of the second copy of the hardware design; and A1 [i], A2 [i], Y1 [i] and Y2 [i] denote the $i^{th}$ bit of the inputs and outputs respectively.

```
mantissa_and_exponent_scaling_assertion: assert property (
    ((A1[22:0] == A2[22:0]) && //same mantissa
        (A1[31] == 0 ) && ( A2[31] == 0)) //sign = 0
    && ((A1[30:23] != 8'hFF) &&
        (A2[30:23] != 8'hFF) //noinfs or NaNs
    && (A1[30:23] != 8'hFE )
        && ( A2[30:23] != 8'hFE )   //no large inputs
        && ((A1[30:23] != 8'hFD) || (A1[22:0] == 0))
        && ((A2[30:23] != 8'hFD) || (A2[22:0] == 0))
    && (A1[30:23] != 8'h00 )
        && ( A2[30:23] != 8'h00 ) ) //no zeroes & denorms
    |-> ((Y1[22:0] == Y2[22:0] )
        && (Y1[30:23] + A1[30:23] == Y2[30:23] +
            A2[30:23])));
```

This assertion ("mantissa_and_exponent_assertion") states that when the inputs to the two copies of the hardware design are positive ((A1 [31]==0) && (A2 [31]==0)) and have the same input mantissa (A1 [22:0]==A2 [22:0]) then in the same cycle (|->) the outputs of the two copies of the hardware design will have the same output mantissa (Y1 [22:0]==Y2 [22:0]) and their output exponents are related as set out in equation (4) (Y1[30:23]+A1[30:23]==Y2[30:23]+ A2[30:23]). The assertion also excludes all of the inputs that produce an exception output (i.e. infinity or NaN (i.e. the exponent (A1/A2 [30:23]) is equal to all ones); large input (the exponent (A1/A2 [30:23]) has a hexadecimal value of FD (8'hFD) and the mantissa (A1/A2 [22:0]) is not equal to zero OR when the exponent (A1/A2 [30:23]) has a hexadecimal value of FE (8'hFE)); and a zero or denormal (i.e. the exponent (A1/A2 [30:23]) is equal to zero (8' h00))). It is noted that in this example the exponent t is equal to −1 thus β is equal to one.

Where a hardware design to implement a floating point power function is not continuously recurrent over the entire input space (all positive and negative inputs) then formally verifying that the hardware design to implement a floating point power function is recurrent for sets of β input exponents may comprise a variation of the formal verification method described above. For example, a hardware design to implement a floating point power function with a fractional value of t may produce an exception output (e.g. NaN) for all negative inputs therefore the recurrency over the positive input values may be verified as described above and the operation of the hardware design may be formally verified through an assertion that states for any negative input an exception output is produced. In another example, if the hardware design of the floating point power function implements rounding, then for certain rounding modes, e.g. round towards positive infinity or round toward negative infinity, the hardware design will not be recurrent over the entire input space. In these examples the recurrency over the positive input values may be formally verified as described above, and the recurrency over the negative input values may be separately verified in the same manner as the positive input values.

Mathematical Proof that Hardware Design Satisfies Allowable ULP Error

The following is a mathematical proof that if the formal verification proves the following is true for a hardware design (F) to implement a floating point power function ($x^t$) where t is a rational number, mant_in_x and exp_in_x are the mantissa and exponent of input x, mant_out_x and exp_out_x are the mantissa and exponent of the output of F when x is input, mant_in_y and exp_in_y are the mantissa and exponent of another input y, mant_out_y and exp_out_y are the mantissa and exponent of the output of F when y is input:
  (a) all input values are positive and non-exception, and for all x, F(x) is non-exception (i.e. not zero, denormal, infinite or NaN);
  (b) for all x, the infinitely precise value of $x^t$ lies within the normal range (i.e. between the smallest and largest representable non-exception floating point values); and
  (c) for all floating point values x and y:
    a. if mant_in_x=mant_in_y and (exp_in_y−exp_in_x) is an integer multiple of $$\frac{1}{t}$$

then
      i. mant_out_x=mant_out_y
      ii. exp_out_x−t·exp_in_x=exp_out_y−t·exp_in_y and the simulation proves that for all x where exp_in_x less the input_bias falls within the range [0, β) then the error will be less than the allowable ulp error (k×ulp($x^t$)) as shown in inequality (6):

$$|F(x)-x^t|<k\times ulp(x^t) \quad (6)$$

then the output of the hardware design for any value of y will satisfy the allowable ulp error as shown in inequality (7)

$$|F(y)-y^t|<k\times ulp(y^t) \quad (7)$$

In particular the error in the output of F(y) relative to the infinitely precise result $y^t$ for any value of y can be expressed as shown in equation (8):

$$|F(y)-y^t|=|2^{exp\_out\_y-output\_bias}\times 1.\text{mant\_out\_y}-y^t| \quad (8)$$

If x is the floating point number with the same mantissa as y then equation (8) becomes as shown in equations (9) and (10).

$$|F(y)-y^t|=|2^{exp\_out\_y-output\_bias}\times 1.\text{mant\_out\_x}-y^t| \quad (9)$$

$$|F(y)-y^t|=|2^{exp\_out\_y-output\_bias}\times 1.\text{mant\_out\_x}-2^{t(exp\_in\_y-exp\_in\_x)}x^t| \quad (10)$$

If the factor $2^{t(exp\_in\_y-exp\_in\_x)}$ is pulled out of equation (10) then equation (10) can be re-written as equations (11) and (12).

$$|F(y)-y^t|= \quad (11)$$
$$2^{t(exp\_in\_y-exp\_in\_x)}\left|2^{exp\_out\_y-output\_bias-t(exp\_in\_y-exp\_in\_x)}\times 1.\text{mant\_out\_x}-x^t\right|$$

$$|F(y)-y^t|= \quad (12)$$
$$2^{t(exp\_in\_y-exp\_in\_x)}\left|2^{(exp\_out\_y-t\cdot exp\_in\_y)-output\_bias+t\cdot exp\_in\_x}\times 1.\text{mant\_out\_x}-x^t\right|$$

Since exp_out_x−t·exp_in_x=exp_out_y−t·exp_in_y, equation (12) can be re-written as equation (13) which reduces to equation (14).

$$|F(y)-y^t|=2^{t(exp\_in\_y-exp\_in\_x)} \quad (13)$$
$$\left|2^{(exp\_out\_x-t\cdot exp\_in\_x)-output\_bias+t\cdot exp\_in\_x}\times 1.\text{mant\_out\_x}-x^t\right|$$

$$|F(y)-y^t|=2^{t(exp\_in\_y-exp\_in\_x)}|F(x)-x^t| \quad (14)$$

Since $|F(x)-x^t|<k\times ulp(x^t)$ then the right hand side of equation (14) must be less than $2^{t(exp\_in\_y-exp\_in\_x)}k\times ulp(x^t)$ as shown in inequality (15):

$$2^{t(exp\_in\_y-exp\_in\_x)}|F(x)-x^t|<2^{t(exp\_in\_y-exp\_in\_x)}k\times ulp(x^t) \quad (15)$$

Since x and y have the same mantissa, x and y are related as shown in equation (16):

$$x=y\times \frac{2^{exp\_in\_x}}{2^{exp\_in\_y}} \quad (16)$$

As such $x^t$ and $y^t$ are related as shown in equation (17):

$$x^t=y^t\times \frac{2^{t\cdot exp\_in\_x}}{2^{t\cdot exp\_in\_y}}=y^t\times 2^{t(exp\_in\_x-exp\_in\_y)} \quad (17)$$

Since x and y have exponents which differ by a multiple of $$\frac{1}{t}$$

the power of 2 in equation (17) is an integer thus the ulp of $x^t$ and $y^t$ can be expressed as shown in equation (18):

$$ulp(x^t) = ulp(y^t) \times 2^{t \cdot (exp\_in\_x - exp\_in\_y)} \quad (18)$$

Equation (18) can be written in terms of ulp($y^t$) as shown in equation (19):

$$ulp(y^t) = ulp(x^t) \times 2^{t \cdot (exp\_in\_y - exp\_in\_x)} \quad (19)$$

From equation (19) it can be seen that the right-hand side of equation (15) is equal to k×ulp($y^t$) indicating that |F(y)−$y^t$|<k×ulp($y^t$) as required.

Mathematical Proof that Hardware Design Satisfies Allowable Relative Error

The proof that the hardware design satisfies the allowable relative error is the same as above except instead of the simulation proving that for all x where exp_in_x less the input_bias falls within the range [0, β) the error is less than the allowable ulp error (k×ulp($x^t$)) the simulation proves that for all x where exp_in_x less the input_bias falls within the range [0, β) the error will be less than the allowable relative error (k×|$x^t$|) as shown in inequality (20):

$$|F(x) - x^t| < k \times |x^t| \quad (20)$$

In a similar manner to above, it can be shown that $$|F(y) - y^t| = 2^{t(exp\_in\_y - exp\_in\_x)} |F(x) - x^t|$$
$$< 2^{t(exp\_in\_y - exp\_in\_x)} k \times |x^t| \quad (21)$$

and $$|y^t| = |x^t| \times 2^{t \cdot (exp\_in\_y - exp\_in\_x)} \quad (22)$$

Thus |F(y)−$y^t$|<k×|$y^t$| as required.

Figure 4:
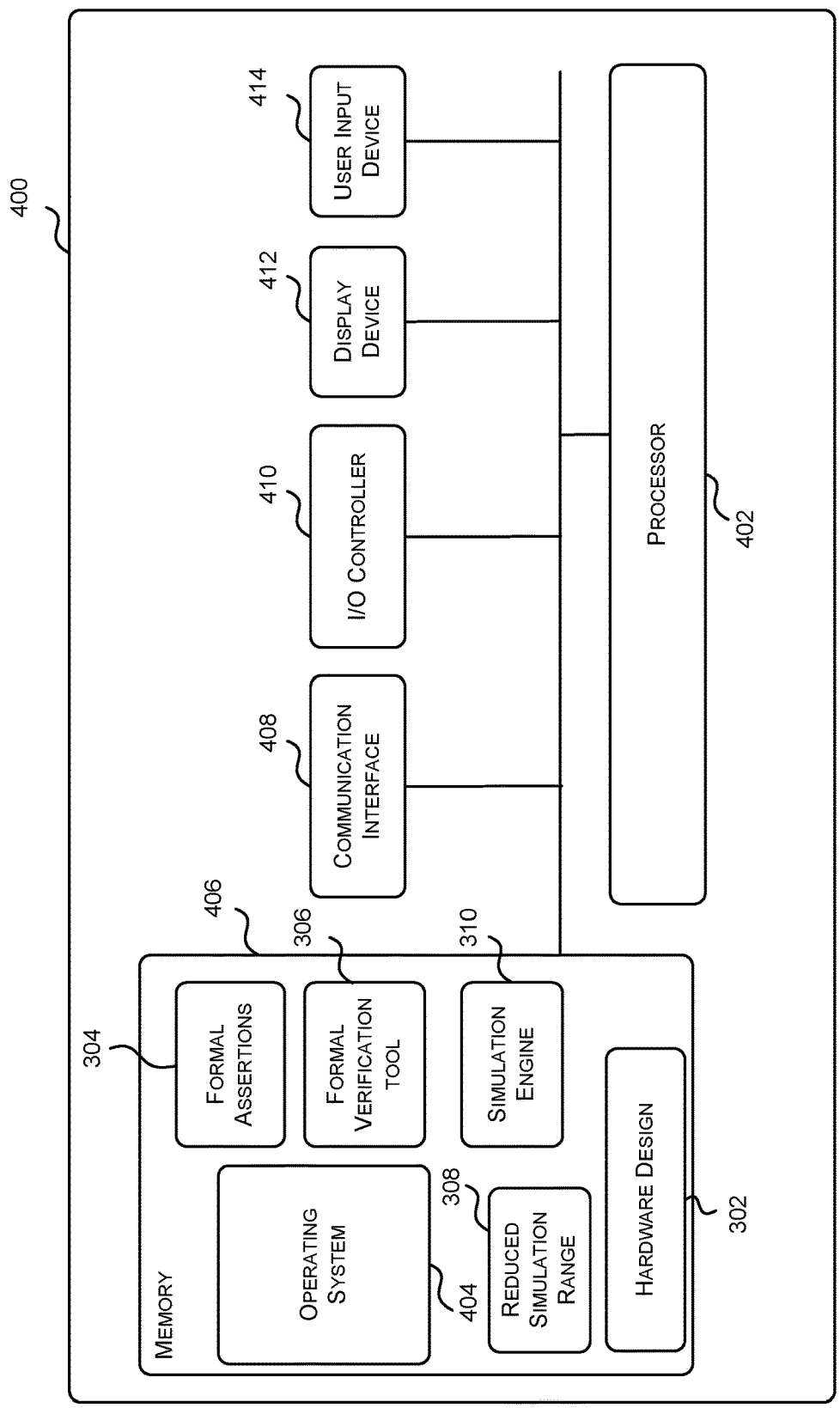
FIG. 4 is a block diagram of an example computing-based device.

FIG. 4 illustrates various components of an exemplary computing-based device 400 which may be implemented as any form of a computing and/or electronic device, and in which embodiments of the methods and systems described herein may be implemented.

Computing-based device 400 comprises one or more processors 402 which may be microprocessors, controllers or any other suitable type of processors for processing computer executable instructions to control the operation of the device in order to exhaustively verify a property of a hardware design to implement a floating point power function. In some examples, for example where a system on a chip architecture is used, the processors 402 may include one or more fixed function blocks (also referred to as accelerators) which implement a part of the method of verifying a property of a hardware design to implement a floating point power function, in hardware (rather than software or firmware). Platform software comprising an operating system 404 or any other suitable platform software may be provided at the computing-based device to enable application software, such as a simulation engine or formal tool, to be executed on the device.

The computer executable instructions may be provided using any computer-readable media that is accessible by computing based device 400. Computer-readable media may include, for example, computer storage media such as memory 406 and communications media. Computer storage media (i.e. non-transitory machine readable media), such as memory 406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 406) is shown within the computing-based device 400 it will be appreciated that the storage may be distributed or located remotely and accessed via a network or other communication link (e.g. using communication interface 408).

The computing-based device 400 also comprises an input/output controller 410 arranged to output display information to a display device 412 which may be separate from or integral to the computing-based device 400. The display information may provide a graphical user interface. The input/output controller 410 is also arranged to receive and process input from one or more devices, such as a user input device 414 (e.g. a mouse or a keyboard). This user input may be used to initiate verification. In an embodiment the display device 412 may also act as the user input device 414 if it is a touch sensitive display device. The input/output controller 410 may also output data to devices other than the display device, e.g. a locally connected printing device (not shown in FIG. 4).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realise that such processing capabilities are incorporated into many different devices and therefore the term 'computer' includes set top boxes, media players, digital radios, PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor as described in the examples herein or to generate a manifestation of a processor configured to perform a method as described in the examples herein. The manifestation of a processor could be the processor itself, or a representation of the processor (e.g. a mask) which can be used to generate the processor.

An example of processing an integrated circuit definition dataset at an integrated circuit manufacturing system so as to configure the system to manufacture a floating point power function will now be described with respect to FIG. 5

Figure 5:
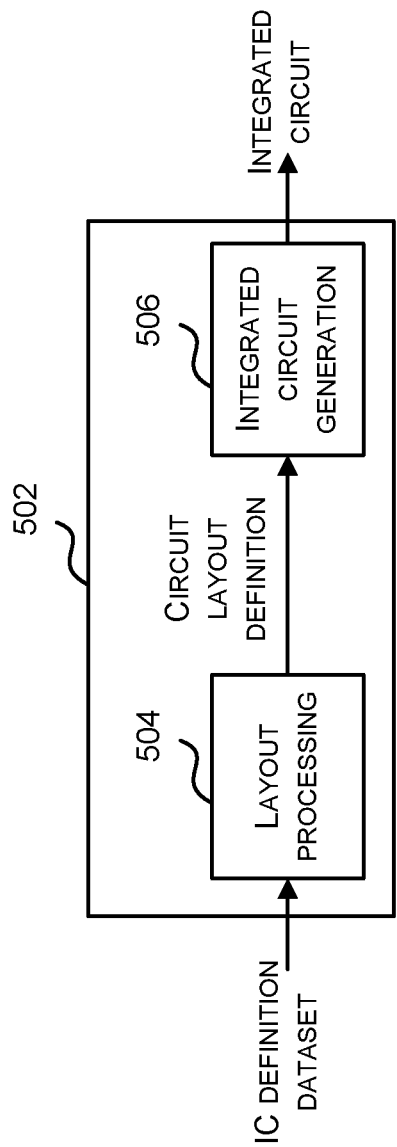
FIG. 5 is a block diagram of an example integrated circuit manufacturing system.

FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. a hardware design to implement a floating point power function), process the IC definition dataset, and generate an IC according to the IC definition dataset (e.g. which embodies a floating point power function). The processing of the IC definition dataset configures the IC manufacturing system 502 to manufacture an integrated circuit. More specifically, the layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC. The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

Aspects of the invention are disclosed in the following numbered clauses:

Clause 1. A computer-implemented method 100 of exhaustively verifying a property of a hardware design to implement a floating point power function defined by an exponent, the hardware design being configured to, in response to receiving a floating point input that has an input mantissa and an input exponent, produce a corresponding floating point output that has an output mantissa and an output exponent, the method 100 comprising, in one or more processors: formally verifying, using one or more formal assertions, that the hardware design is recurrent over sets of $\beta$ input exponents, the hardware design being recurrent over sets of $\beta$ input exponents if for any two non-exception floating point inputs in a recurrent input range that have the same input mantissa and have input exponents X and Y that are related by an integer multiple of $\beta$ the corresponding floating point outputs produced by the hardware design have the same output mantissa and have output exponents X' and Y' that satisfy the equation X'−t·X=Y'−t·Y, wherein t is the exponent of the floating point power function and $\beta$ is an integer that is a multiple of 1/t 110; and for each recurrent input range of the hardware design, exhaustively simulating the hardware design over a simulation range to verify the property over the simulation range, wherein the simulation range comprises floating point inputs based on a set of $\beta$ input exponents in the recurrent input range 112.

Clause 2. The method 100 of clause 1, wherein the set of $\beta$ input exponents comprises an input exponent from each of a plurality of exponent classes, each exponent class comprising input exponents with a same value modulo $\beta$.

Clause 3. The method 100 of clause 1 or clause 2, wherein the hardware design has a single recurrent input range that comprises positive and negative floating point inputs and formally verifying the hardware design is recurrent over sets of $\beta$ input exponents comprises: formally verifying that the hardware design maintains a predetermined relationship between positive and negative floating point inputs; and formally verifying that for any two non-exception positive floating point inputs, or for any two non-exception negative floating points inputs, that have the same input mantissa and have input exponents X and Y that differ by an integer multiple of $\beta$ the corresponding floating point outputs produced by the hardware design have the same output mantissa and have output exponents X' and Y' that satisfy the equation X'−t·X=Y'−t·Y.

Clause 4. The method 100 of clause 1 or clause 2, wherein the hardware design has a first recurrent input range comprising positive floating point inputs and a second recurrent input range comprising negative floating point inputs and formally verifying the hardware design is recurrent over sets of $\beta$ input exponents comprises: formally verifying that for any two non-exception positive floating point inputs that have the same input mantissa and have input exponents X and Y that differ by an integer multiple of $\beta$ the corresponding floating point outputs have the same output mantissa and have output exponents X' and Y' that are satisfy the equation X'−t·X=Y'−t·Y; and formally verifying that for any two non-exception negative floating points inputs that have the same input mantissa and have input exponents A and C that differ by an integer multiple of $\beta$ the corresponding floating point outputs have the same output mantissa and have output exponents A' and C' that satisfy the equation A−t·A'=C−t·C'.

Clause 5. The method 100 of any preceding clause, further comprising formally verifying that the hardware design generates expected outputs in response to exception inputs.

Clause 6. The method 100 of any preceding clause, further comprising formally verifying that the hardware design produces exception outputs in response to certain non-exception inputs 104.

Clause 7. The method 100 of any preceding clause, wherein formally verifying that the hardware design is recurrent over sets of $\beta$ input exponents comprises verifying, using a formal verification tool, the one or more formal assertions.

Clause 8. The method 100 of any preceding clause, wherein the property of the hardware design is a unit of last precision error requirement.

Clause 9. The method 100 of any of clauses 1 to 7, wherein the property of the hardware design is a relative error requirement.

Clause 10. The method 100 of any of clauses 1 to 7, wherein the property of the hardware design is a particular rounding mode.

Clause 11. The method 100 of any of clauses 1 to 7, wherein the property of the hardware design is monotonicity.

Clause 12. The method 100 of any of clauses 1 to 7, wherein the property of the hardware design is that the hardware design is equivalent to another hardware design to implement the floating point power function.

Clause 13. The method 100 of any preceding clause wherein when the hardware design is processed at an integrated circuit manufacturing system, the hardware design configures the integrated circuit manufacturing system to manufacture an integrated circuit to implement the floating point power function.

Clause 14. A method of generating a hardware implementation of a floating point power function comprising: receiving a hardware design to implement the floating point power function; verifying a property of the hardware design according to the method 100 of any of clauses 1 to 13; and generating a hardware implementation of the floating point power function based on the hardware design.

Clause 15. A method of generating a hardware implementation of a floating point power function comprising: receiving a hardware design to implement the floating point power function; verifying a property of the hardware design according to the method 100 of any of clauses 1 to 13; in response to the property of the hardware design not being verified, amending the hardware design; and generating a hardware implementation of the floating point power function based on the amended hardware design.

Clause 16. A system 300 for exhaustively verifying a property of a hardware design 302 to implement a floating point power function defined by an exponent, the hardware design being configured to, in response to receiving a floating point input that has an input mantissa and an input exponent, produce a corresponding floating point output that has an output mantissa and an output exponent, the system 300 comprising: a formal verification tool 306 configured to formally verify that the hardware design 302 is recurrent over sets of $\beta$ input exponents, the hardware design being recurrent over sets of $\beta$ input exponents if for any two non-exception floating point inputs in a recurrent input range that have the same input mantissa and have input exponents X and Y that differ by an integer multiple of $\beta$ the corresponding floating point outputs produced by the hardware design have the same output mantissa and have output exponents X' and Y' that satisfy the equation $X'-t \cdot X = Y'-t \cdot Y$, wherein t is the exponent of the floating point power function and $\beta$ is an integer that is a multiple of 1/t; and a simulation engine 310 configured to, for each recurrent input range of the hardware design 302, exhaustively simulate the hardware design over a simulation range 308 to verify the property over the simulation range 308, wherein the simulation range comprises floating point inputs based on a set of $\beta$ input exponents in the recurrent input range.

Clause 17. The system 300 of clause 16, wherein the set of $\beta$ input exponents comprises an input exponent from each of a plurality of exponent classes, each exponent class comprising input exponents with a same value modulo $\beta$.

Clause 18. The system 300 of clause 16 or clause 17, wherein the hardware design 302 has a single recurrent input range that comprises positive and negative floating point inputs and the formal verification tool is configured to formally verify the hardware design 302 is recurrent over sets of $\beta$ input exponents by: formally verifying that the hardware design 302 maintains a predetermined relationship between positive and negative floating point inputs; formally verifying that for any two non-exception positive floating point inputs, or for any two non-exception negative floating points inputs, that have the same input mantissa and have input exponents X and Y that differ by an integer multiple of $\beta$ the corresponding floating point outputs produced by the hardware design 302 have the same output mantissa and have output exponents X' and Y' that satisfy the equation $X'-t \cdot X = Y'-t \cdot Y$.

Clause 19. The system 300 of clause 16 or clause 17, wherein the hardware design 302 has a first recurrent input range comprising positive floating point inputs and a second recurrent input range comprising negative floating point inputs and the formal verification tool is configured to formally verify the hardware design 302 is recurrent over sets of $\beta$ input exponents by: formally verifying that for any two non-exception positive floating point inputs that have the same input mantissa and have input exponents X and Y that differ by an integer multiple of $\beta$ the corresponding floating point outputs produced by the hardware design 302 have the same output mantissa and have output exponents X' and Y' that satisfy the equation $X'-t \cdot X = Y'-t \cdot Y$; and formally verifying that for any two non-exception negative floating points inputs that have the same input mantissa and have input exponents A and C that differ by an integer multiple of $\beta$ the corresponding floating point outputs produced by the hardware design 302 have the same output mantissa and have output exponents A' and C' that satisfy the equation $A'-t \cdot A = C'-t \cdot C$.

Clause 20. The system 300 of any of clauses 16 to 19, wherein the formal verification tool 306 is further configured to formally verify that the hardware design 302 generates expected outputs in response to exception inputs.

Clause 21. The system 300 of any of clauses 16 to 20, wherein the formal verification tool 306 is further configured to formally verify that the hardware design 302 produces exception outputs in response to certain non-exception inputs.

Clause 22. The system 300 of any of clauses 16 to 21, wherein the formal verification tool 306 is configured to formally verify that the hardware design 302 is recurrent over sets of $\beta$ input exponents by verifying one or more assertions written in an assertion-based language.

Clause 23. The system 300 of any of clauses 16 to 22, wherein the property of the hardware design 302 is a unit of last precision error requirement.

Clause 24. The system 300 of any of clauses 16 to 22, wherein the property of the hardware design 302 is a relative error requirement.

Clause 25. The system 300 of any of clauses 16 to 22, wherein the property of the hardware design 302 is a particular rounding mode.

Clause 26. The system 300 of any of clauses 16 to 22, wherein the property of the hardware design 302 is monotonicity.

Clause 27. The system 300 of any of clauses 16 to 22, wherein the property of the hardware design 302 is that the hardware design 302 is equivalent to another hardware design of the floating point power function.

Clause 28. The system 300 of any of clauses 16 to 27, further comprising an integrated circuit manufacturing system 502 configured to process the hardware design 302 so as to manufacture an integrated circuit to implement the floating point power function.

Clause 29. The system 300 of clause 28, wherein the integrated circuit manufacturing system 502 comprises: a non-transitory computer readable storage medium having stored thereon the hardware design 302; a layout processing system 504 configured to process the hardware design 302 so as to generate a circuit layout description of an integrated circuit to implement the floating point power function; and an integrated circuit generation system 506 configured to manufacture the integrated circuit to implement the floating point power function according to the circuit layout description.

What is claimed is:

1. A computer-implemented method of verifying a property of a hardware design to implement a floating point power function defined by an exponent, the hardware design being configured to, in response to receiving a floating point input that has an input mantissa and an input exponent, produce a corresponding floating point output that has an output mantissa and an output exponent, the method comprising, in one or more processors:

formally verifying that the hardware design is recurrent over sets of β input exponents in each recurrent input range of the hardware design, wherein β is an integer that is a multiple of the reciprocal of the exponent of the floating point power function; and for each recurrent input range of the hardware design, simulating the hardware design over a simulation range to verify the property over the simulation range, wherein the simulation range comprises floating point inputs based on a set of β input exponents in the recurrent input range.

2. The method of claim 1, wherein the set of β input exponents comprises an input exponent from each of a plurality of exponent classes, each exponent class comprising input exponents with a same value modulo β.

3. The method of claim 1, wherein the hardware design has a single recurrent input range that comprises positive and negative floating point inputs and formally verifying the hardware design is recurrent over sets of β input exponents in each recurrent input range of the hardware design comprises:

formally verifying that the hardware design maintains a predetermined relationship between positive and negative floating point inputs; and formally verifying that for any two non-exception positive floating point inputs, or for any two non-exception negative floating points inputs, that have the same input mantissa and have input exponents X and Y that differ by an integer multiple of β the corresponding floating point outputs produced by the hardware design have the same output mantissa and have output exponents X' and Y' that satisfy the equation X'−t·X=Y'−t·Y wherein t is the exponent of the power function.

4. The method of claim 1, wherein the hardware design has a first recurrent input range comprising positive floating point inputs and a second recurrent input range comprising negative floating point inputs and formally verifying the hardware design is recurrent over sets of β input exponents in each recurrent input range of the hardware design comprises:

formally verifying that for any two non-exception positive floating point inputs that have the same input mantissa and have input exponents X and Y that differ by an integer multiple of β the corresponding floating point outputs have the same output mantissa and have output exponents X' and Y' that satisfy the equation X'−t·X=Y'−t·Y wherein t is the exponent of the power function; and formally verifying that for any two non-exception negative floating points inputs that have the same input mantissa and have input exponents A and C that differ by an integer multiple of β the corresponding floating point outputs have the same output mantissa and have output exponents A' and C' that satisfy the equation A'−t·A=C'−t·C.

5. The method of claim 1, further comprising formally verifying that the hardware design generates expected outputs in response to exception inputs.

6. The method of claim 1, further comprising formally verifying that the hardware design produces exception outputs in response to certain non-exception inputs.

7. The method of claim 1, wherein formally verifying that the hardware design is recurrent over sets of β input exponents in a recurrent input range comprises verifying, using a formal verification tool, one or more formal assertions.

8. The method of claim 1, wherein the property of the hardware design is a unit of last precision error requirement.

9. The method of claim 1, wherein the property of the hardware design is a relative error requirement.

10. The method of claim 1, wherein the property of the hardware design is a particular rounding mode.

11. The method of claim 1, wherein the property of the hardware design is monotonicity.

12. The method of claim 1, wherein the property of the hardware design is that the hardware design is equivalent to another hardware design to implement the floating point power function.

13. The method of claim 1, wherein when the hardware design is processed at an integrated circuit manufacturing system, the hardware design configures the integrated circuit manufacturing system to manufacture an integrated circuit to implement the floating point power function.

14. A method of generating a hardware implementation of a floating point power function comprising:

receiving a hardware design to implement the floating point power function;

verifying a property of the hardware design according to the method as set forth in claim 1; and generating a hardware implementation of the floating point power function based on the hardware design.

15. A method of generating a hardware implementation of a floating point power function comprising:

receiving a hardware design to implement the floating point power function;

verifying a property of the hardware design according to the method as set forth in claim 1;

in response to the property of the hardware design not being verified, amending the hardware design; and generating a hardware implementation of the floating point power function based on the amended hardware design.

16. A non-transitory computer readable storage medium having stored thereon computer readable instructions that, when executed at a computer system, cause the computer system to perform the steps of:

formally verifying that a hardware design to implement a floating point power function defined by an exponent is recurrent over sets of β input exponents in each recurrent input range of the hardware design, the hardware design being configured to, in response to receiving a floating point input that has an input mantissa and an input exponent, produce a corresponding floating point output that has an output mantissa and an output exponent, wherein β is an integer that is a multiple of the reciprocal of the exponent of the floating point power function; and for each recurrent input range of the hardware design, simulating the hardware design over a simulation range to verify the property over the simulation range, wherein the simulation range comprises floating point inputs based on a set of $\beta$ input exponents in the recurrent input range.

17. A system to verify a property of a hardware design to implement a floating point power function defined by an exponent, the hardware design being configured to, in response to receiving a floating point input that has an input mantissa and an input exponent, produce a corresponding floating point output that has an output mantissa and an output exponent, the system comprising:
   a formal verification tool configured to formally verify that the hardware design is recurrent over sets of $\beta$ input exponents in each recurrent input range of the hardware design, wherein $\beta$ is an integer that is a multiple of the reciprocal of the exponent of the floating point power function; and
   a simulation engine configured to, for each recurrent input range of the hardware design, simulate the hardware design over a simulation range to verify the property over the simulation range, wherein the simulation range comprises floating point inputs based on a set of $\beta$ input exponents in the recurrent input range.

18. The system of claim 17, wherein the set of $\beta$ input exponents comprises an input exponent from each of a plurality of exponent classes, each exponent class comprising input exponents with a same value modulo $\beta$.

19. The system of claim 17, wherein the hardware design has a single recurrent input range that comprises positive and negative floating point inputs and the formal verification tool is configured to formally verify that the hardware design is recurrent over sets of $\beta$ input exponents in each recurrent input range of the hardware design by:
   formally verifying that the hardware design maintains a predetermined relationship between positive and negative floating point inputs; and
   formally verifying that for any two non-exception positive floating point inputs, or for any two non-exception negative floating points inputs, that have the same input mantissa and have input exponents X and Y that differ by an integer multiple of $\beta$ the corresponding floating point outputs produced by the hardware design have the same output mantissa and have output exponents X' and Y' that satisfy the equation $X'-t \cdot X = Y'-t \cdot Y$ wherein t is the exponent of the power function.

20. The system of claim 17, further comprising an integrated circuit manufacturing system comprising:
   a non-transitory computer readable storage medium having stored thereon the hardware design;
   a layout processing system configured to process the hardware design so as to generate a circuit layout description of an integrated circuit to implement the floating point power function; and
   an integrated circuit generation system configured to manufacture the integrated circuit to implement the floating point power function according to the circuit layout description.

\* \* \* \* \*